United States Patent
Junqua et al.

(10) Patent No.: US 7,124,085 B2
(45) Date of Patent: Oct. 17, 2006

(54) CONSTRAINT-BASED SPEECH RECOGNITION SYSTEM AND METHOD

(75) Inventors: Jean-Claude Junqua, Santa Barbara, CA (US); Matteo Contolini, Santa Barbara, CA (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 1052 days.

(21) Appl. No.: 10/022,023

(22) Filed: Dec. 13, 2001

(65) Prior Publication Data
US 2003/0115057 A1 Jun. 19, 2003

(51) Int. Cl.
G10L 15/00 (2006.01)
G10L 15/26 (2006.01)

(52) U.S. Cl. .................. 704/270.1; 704/235
(58) Field of Classification Search .......... None
See application file for complete search history.

(56) References Cited

U.S. PATENT DOCUMENTS

| | | | |
|---|---|---|---|
| 5,131,045 A * | 7/1992 | Roth | 704/237 |
| 5,530,950 A * | 6/1996 | Medan et al. | 379/88.24 |
| 5,802,251 A | 9/1998 | Cohen et al. | |
| 5,855,000 A * | 12/1998 | Waibel et al. | 704/235 |
| 5,912,949 A | 6/1999 | Chan et al. | |
| 5,917,890 A * | 6/1999 | Brotman et al. | 379/88.01 |
| 5,940,793 A | 8/1999 | Attwater et al. | |
| 5,960,399 A * | 9/1999 | Barclay et al. | 704/270.1 |
| 5,963,666 A * | 10/1999 | Fujisaki et al. | 382/187 |
| 6,044,347 A * | 3/2000 | Abella et al. | 704/272 |
| 6,058,366 A * | 5/2000 | Tarkiainen et al. | 704/270 |
| 6,078,886 A * | 6/2000 | Dragosh et al. | 704/270 |
| 6,505,162 B1 * | 1/2003 | Wang et al. | 704/275 |
| 6,728,348 B1 | 4/2004 | Denenberg et al. | |
| 6,952,799 B1 * | 10/2005 | Edwards et al. | 715/501.1 |
| 2001/0023397 A1 * | 9/2001 | Tajima et al. | 704/231 |

FOREIGN PATENT DOCUMENTS

| | | |
|---|---|---|
| EP | 0961263 A2 | 12/1999 |
| EP | 0961263 A3 | 1/2000 |
| WO | WO 01/82043 A2 | 11/2001 |
| WO | WO 02/05263 A1 | 1/2002 |

OTHER PUBLICATIONS

Annex to the European Search Report for European Patent Application No. EP 02258061, dated Nov. 8, 2004.

* cited by examiner

Primary Examiner—David D. Knepper
(74) Attorney, Agent, or Firm—Harness, Dickey & Pierce, PLC

(57) ABSTRACT

A constraint-based speech recognition system for use with a form-filling application employed over a telephone system is disclosed. The system comprises an input signal, wherein the input signal includes both speech input and non-speech input of a type generated by a user via a manually operated device. The system further comprises a constraint module operable to access an information database containing information suitable for use with speech recognition, and to generate candidate information based on the non-speech input and the information database, wherein the candidate information corresponds to a portion of the information. The system further comprises a speech recognition module operable to recognize speech based on the speech input and the candidate information. In an exemplary embodiment, the manually operated device is a touch-tone telephone keypad, and the information database is a lexicon encoded according to classes defined by the keys of the keypad.

18 Claims, 4 Drawing Sheets

CONSTRAINT-BASED SPEECH RECOGNITION SYSTEM AND METHOD

FIELD OF THE INVENTION

The present invention generally relates to speech recognition and particularly relates to constraint-based speech recognition systems and methods for use with form-filling applications employed over a telephone system.

BACKGROUND OF THE INVENTION

There is considerable interest today in facilitating speech recognition with form-filling applications employed over a telephone system, and various systems and methods have been developed to facilitate the task of accomplishing speech recognition over the telephone. For example, to solve the problem of entering names, methods have been developed wherein the system asks the user to say both the name and the spelling of the name. Further in accord with these methods, two recognition experiments are conducted and the most coherent result is output. Similarly, constraint-based systems combine the spoken input of the name with a first spoken input, such as the initials, the identification of the user, or the user location. The first recognition result, after confirmation by the user, is used to constrain the second recognition process.

Unfortunately, the problems associated with speech recognition over the telephone affect all spoken input over the phone, and thus become compounded where a constraint-based speech recognition system uses recognized spoken input to constrain the second recognition process. Thus, fulfilling the need for a more reliable system and method of constraint for use with a speech recognition system over the telephone remains the task of the present invention.

SUMMARY OF THE INVENTION

In a first aspect, the present invention is a constraint-based speech recognition system for use with a form-filling application employed over a telephone system. The system comprises an input signal, wherein the input signal includes both speech input and non-speech input of a type generated by a user via a manually operated device. The system further comprises a constraint module operable to access an information database containing information suitable for use with speech recognition. The constraint module is further operable to generate candidate information based on the non-speech input and the information database, wherein the candidate information corresponds to a portion of the information. The system further comprises a speech recognition module operable to recognize speech based on the speech input and the candidate information.

In a second aspect, the present invention is a constraint-based speech recognition method for use with a form-filling application employed over a telephone system. The method comprises receiving an input signal, wherein the signal includes both speech input and non-speech input, and wherein the non-speech input corresponds to input of the type generated by a user via a manually operated device. The method further comprises accessing an information database containing information suitable for use with speech recognition. The method further comprises generating candidate information based on the non-speech input, wherein the candidate information corresponds to a portion of the information. The method further comprises recognizing speech based on the speech input and the candidate information.

In a third aspect, the present invention is an information database residing in memory operable with a data processing system. The information database contains information suitable for use with a speech recognition system running on the data processing system. The information database is further encoded according to classes defined by a manually operated device.

In a fourth aspect, the present invention is a method of constraint for use with a speech recognition system. The method comprises receiving an input signal, wherein the signal includes non-speech input of the type generated by a user via a keypad of the type used with a touch-tone telephone. The method further comprises accessing an information database containing searchable information. The method further comprises generating candidate information based on the non-speech input, the candidate information corresponding to a portion of the searchable information.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
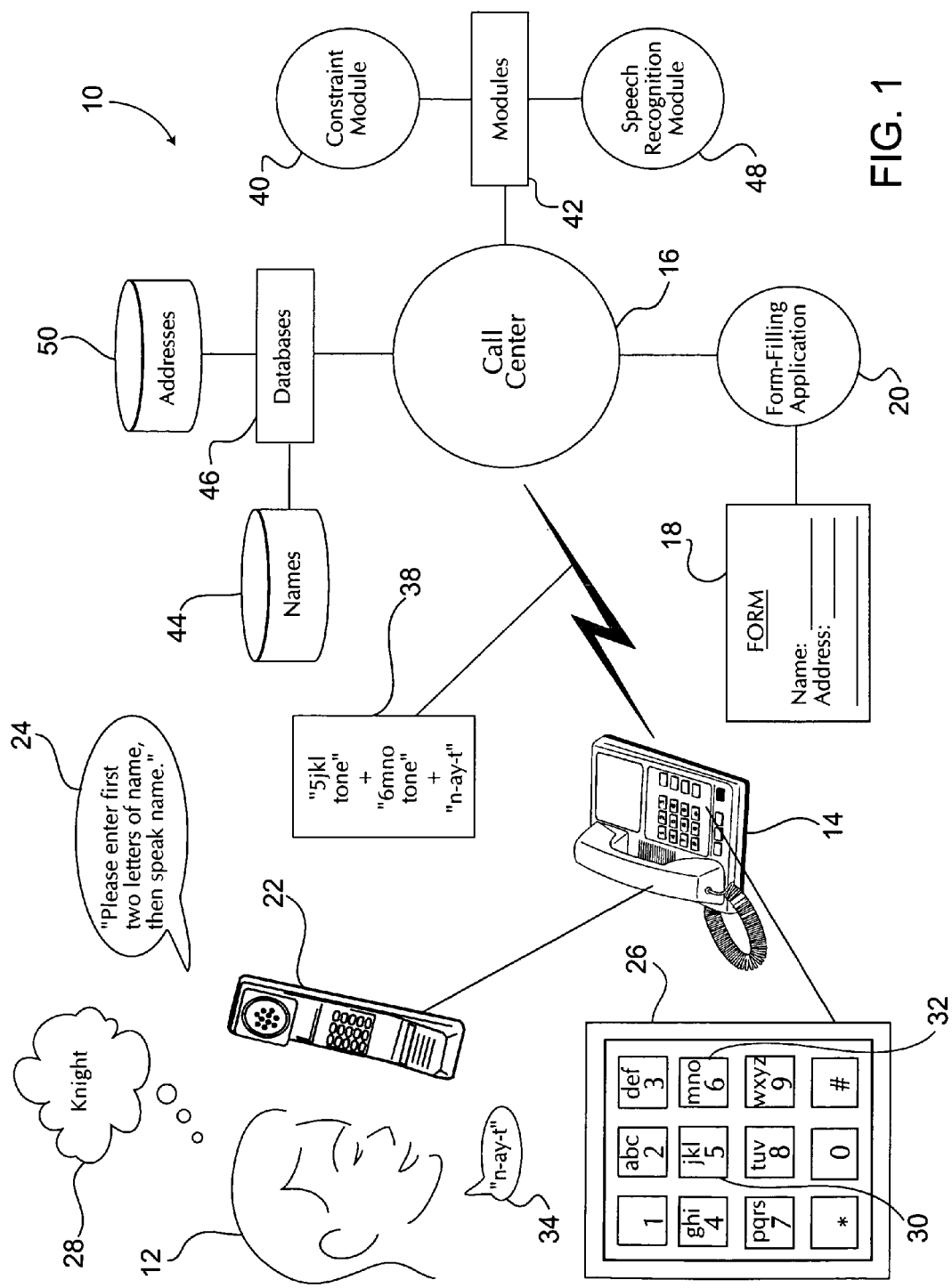
FIG. 1 is a diagram of the present invention operably integrated with an automatic form-filling application at a call center.

Referring to FIG. 1, an automatic form-filling system 10 is shown that employs the present invention. Consistent with the system and method of the present invention, a user 12 communicates via telephone 14 with a call center 16. In attempting to fill a name field of a form data structure 18, a form-filling application 20 prompts user 12 via handset 22 to enter the first two letters of the name and then speak the name as shown at 24. Hence, user 12 complies with the requests of the form-filling application 20 by entering the first two letters of the name via keypad 26. With the name corresponding to "Knight" as shown at 28, user 12 selects a first key 30 and a second key 32 and communicates speech as shown at 34 via handset 22.

A resulting input signal 36 includes tones (e.g. DTMF) indicative of classes defined by the first key 30 and the second key 32, and also includes user speech as shown at 38. In accordance with the system and method of the present invention, input signal 36 is received at call center 16 and a constraint module 40 of a plurality of modules 42 accesses name database 44 of a plurality of databases 46 and generates candidate information based on the non-speech portion of input signal 36 and the name database 44. The plurality of databases 46 are further defined as databases containing information suitable for use with speech recognition, such as names or addresses combined with matching phoneme data, but an additional example includes names alone, absent matching phoneme data. The suitability of use with speech recognition still pertains where the information is suitable to serve as input at any point in the speech recognition process. Thus, a set of names absent matching phoneme data proves useful with a speech recognition process capable of taking names as input absent matching phoneme data. Additionally, the information contained in the database need not be directly suitable for use with speech recognition, but may also be indirectly suitable. Thus, directly suitable information for use in speech recognition may be built on the fly based on some input found in the information database.

Accordingly, speech recognition module 48 recognizes speech based on the speech portion of input signal 36 and the candidate information. The speech recognition process is greatly facilitated where speech recognition is constrained to candidate information generated in a reliable manner. As will be readily appreciated by one skilled in the art, the system and method of the present invention may also be readily applicable to fill an address field or other field of form data structure 18. For example, user 12 may be prompted to enter a zip code and then speak the address. A zip code may be readily entered by a hand set 26 permitting constraint module 40 to access address database 50 and generate candidate information based on the non-speech portion of the input signal 36, greatly facilitating speech recognition regarding the spoken address.

Figure 2:
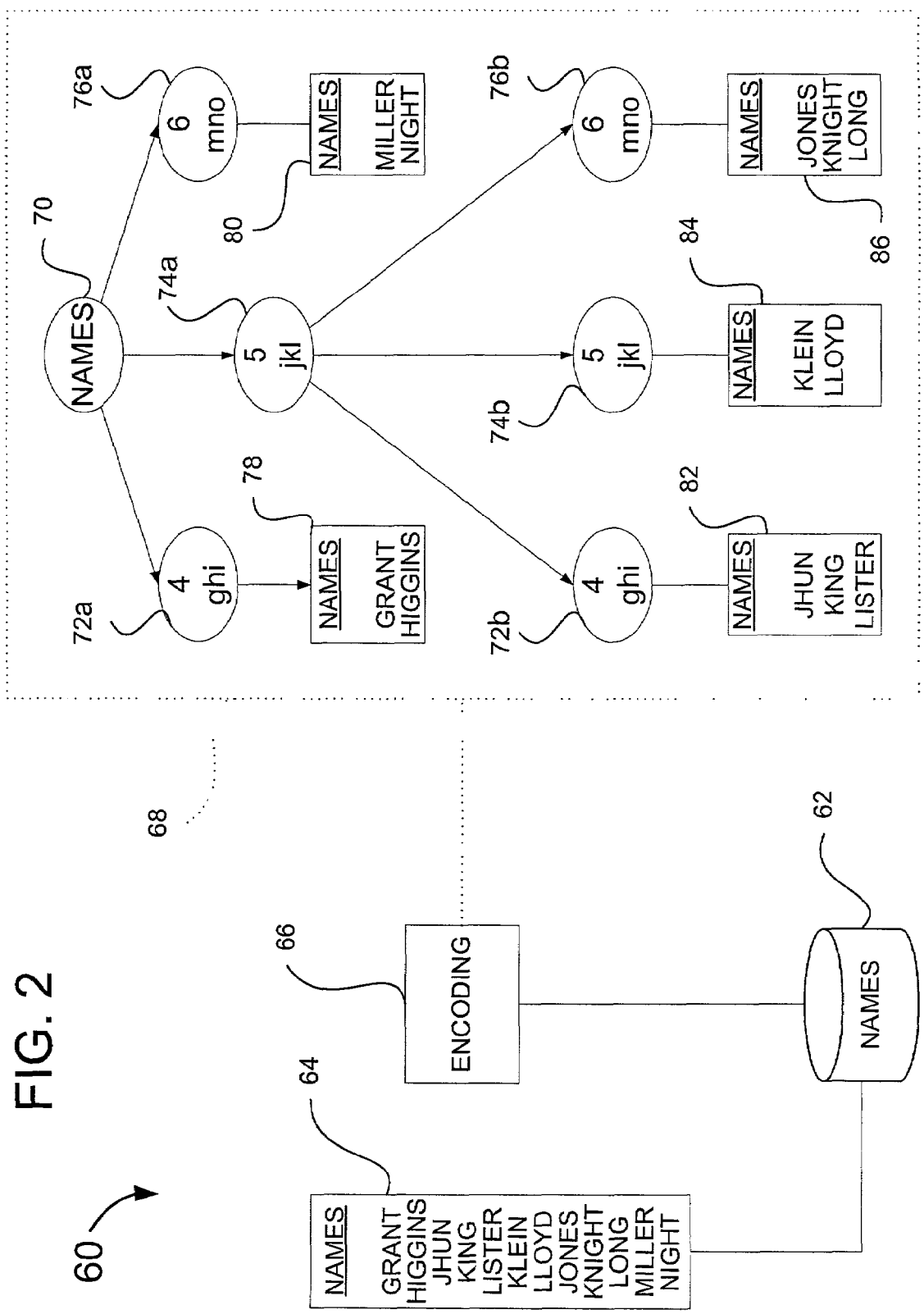
FIG. 2 is a diagram of a name database encoded according to the system and method of the present invention.

Referring to FIG. 2, an encoded database 60 encoded according to the system and method of the present invention is shown. The contents 64 of name database 62 are encoded according to classes defined by a touch tone telephone keypad. The encoding 66 is demonstrated as a trie as shown at 68. Depending from root node 70, a first class 72A, a second class 74A, and a third class 76A serve to constrain the contents 64 of database 62 according to a class first input by a user. As a result, upon entry of first class 72A, first short list 78 may be readily defined and generated for search. First short list 78 contains names beginning with letters present in first class 72A. Similarly, second short list 80 may be readily generated for search upon entry of third class 76A. Accordingly, second short list 80 contains names beginning with letters present in third class 76A. Upon entry of second class 74A however, further constraint is required.

First class 72B, second class 74B, and third class 76B further depend from second class 74A. Accordingly, entry of a class following a first entry provides further constraint. For example, subsequent entry of first class 72B permits constraint to third short list 82. Likewise, subsequent entry of second class 74B permits further constraint to fourth short list 84, whereas subsequent entry of third class 76B provides further constraint to fifth short list 86. Third short list 82, contains names having first letters contained within second class 74A, and having second letters contained within first class 72B. Likewise, fourth short list 84 contains names having first letters contained within second class 74A, and having second letters contained within second class 74B. Similarly, fifth short list 86 contains names having first letters contained within second class 74A, and having second letters contained within third class 76B.

Entry of second class 74A followed by entry of third class 76B permits constraint of contents 64 of database 62 to third short list 86. As a result of that constraint, speech recognition regarding the name "Knight" may be greatly improved over speech recognition attempted regarding the entire contents 64 of name database 62. Thus, the phoneme combination "n-ay-t" may be readily recognized as "Knight" rather than, for example, "Night." The present invention eliminates confusion in this case by taking advantage of the fact that the "K" in Knight belongs to the class corresponding to the 5 key on the keypad, whereas the "N" in Night does not. Hence, speech recognition is greatly improved.

Figure 3:
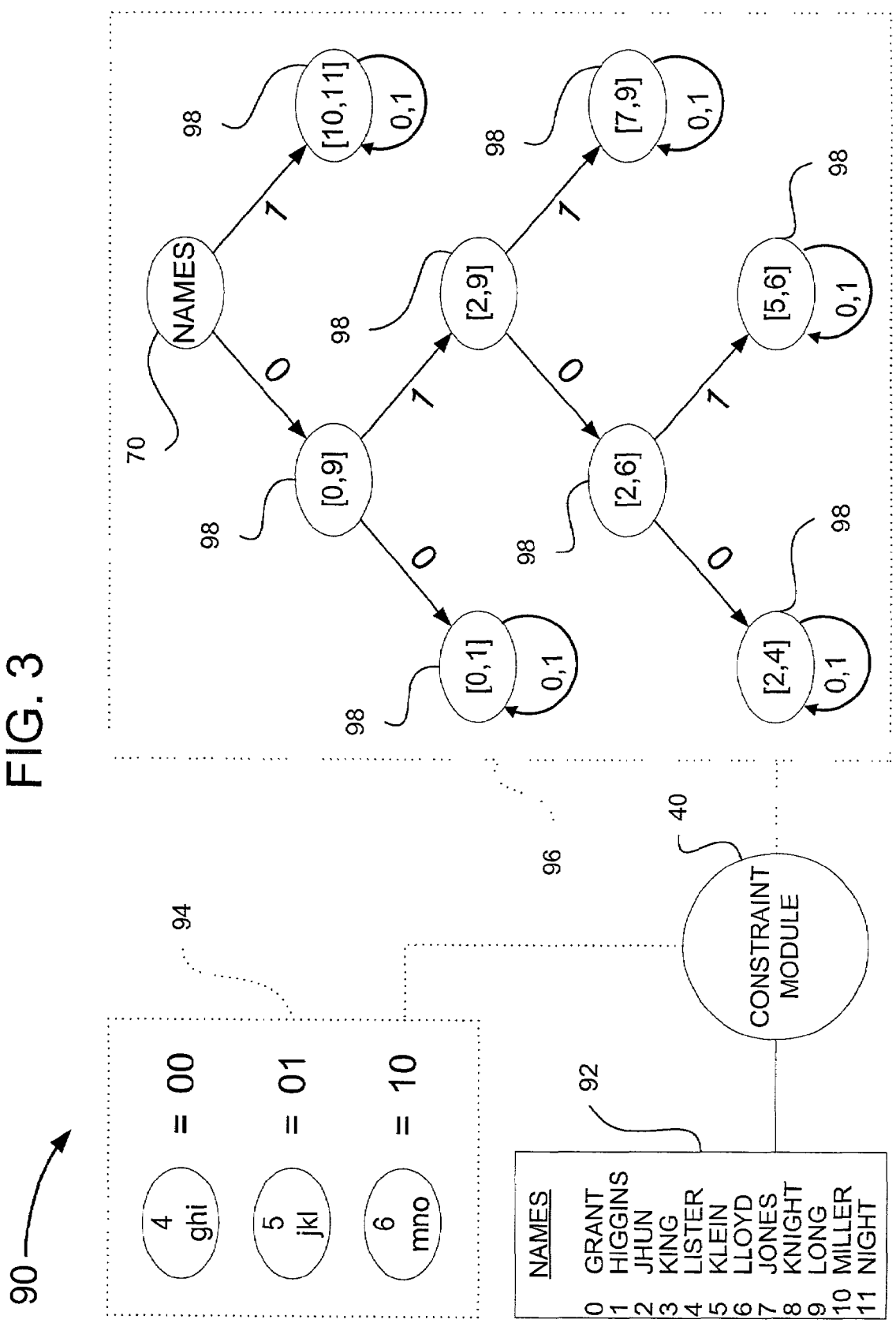
FIG. 3 is a diagram demonstrating Huffman encoding for a name database encoded according to the system and method of the present invention.

As may be readily appreciated by one skilled in the art, various means exist for encoding databases useful for speech recognition. These means include Huffman encoding, Digital Search Trees, 2-3 Trees, (a, b)-Trees, B-Trees, AVL Trees, etc. For example, referring to FIG. 3, an example Huffman encoding implementation 90 is shown. The names reside in a zero-indexed array 92, while binary code inputs 94 are defined for each input class. Thus, Huffman encoding tree 96 is implemented in the usual way with binary branches descending from parents to children according to binary inputs. Specifically, root node 70 features eight child nodes 98 reachable by paths according to binary inputs corresponding to binary code inputs 94. For example, input of the first class comprising "4,g,h,i" corresponds to a "00" path leading to array indices "[0,1]." Hence, constraint module 40 may use these indices to retrieve the contents of the first short list from zero-indexed array 92. Similarly, input of the second class comprising "5,j,k,l" followed by input of the third class comprising "6,m,n,o" corresponds to path "0110," and following this path leads to array indices "[7,9]." Hence, constraint module 40 may use these indices to retrieve the contents of the fifth short list from zero-indexed array 92 by retrieving all contents of the array between these two indices and inclusive of the two indices.

As will be readily appreciated, each set of array indices constitutes a short list, some of which are further comprised of short lists determinable by further constraint. For example, entry of only second class comprising "5jkl" permits constraint to the short list defined by array indices "[2,9]" by virtue of the corresponding path "01." Further constraint occurs with a subsequent entry of a second class, and further constraint along these lines could even lead to a short list containing only one word. In the latter case, speech recognition is not required to determine the identity of the name, but one skilled in the art will readily appreciate that sufficiently large database contents may not generally be constrained to a single possibility by the system and method of the present invention. Thus, a serviceable embodiment may require entry of an entire string in the case of a large name database to constrain recognition to the shortest possible list.

Entry of entire names, however, may be taxing and/or time consuming. Thus it may be preferable to require entry by a user of only so many classes as required to provide sufficient constraint for speech recognition. What constitutes sufficient constraint may vary from system to system, application to application, and circumstance to circumstance. However, at least two definitions of sufficient constraint may be used. For example, a maximum length of the short list, such as one-hundred names, may serve as a definition of sufficient constraint. Conversely, sufficient constraint may be defined as elimination of confusability between words on the list to a certain degree.

In the latter case, the number of candidates can be dictated by the measure of confusability on the lexicon. To accomplish this type of constraint, the lexicon stores the pronunciation of each name in association with its spelling. Names that differ in pronunciation by only one phoneme, for example, would have a higher mutual confusability index than those that differ by many phonemes. As another example, a distance measure between two words based on a confusion table between phonemes can be used to determine a measure of confusability. Also, many other ways exist to determine confusability indices. Such confusability indices may be used to define how constrained the search space needs to be. If the members within a given search space are not highly confusable (as determined by assessing their mutual confusability indices) then a larger, less constrained search space is used. Conversely, if the members are relatively confusable, a smaller, more constrained search space is used. In the latter case, the user would be asked to input a greater number touch tone characters, thereby reducing the size of the search space.

In light of the above, sufficient constraint may be determined to exist when words on a short list differ from one another by at least one phoneme, thus eliminating homonyms. It is also foreseeable that the two definitions may be combined, so that, for example, a length of one-hundred words or less will suffice unless homonyms exist in the list, and then further constraint will be required to separate the homonyms into shorter lists. Such a solution guarantees a sufficiently short search time by defining a maximum number of candidates in the search space, while also improving speech recognition results by eliminating confusability. Other definitions for sufficient constraint will be readily apparent to those skilled in the art given the foregoing disclosure, especially with regard to different applications of form-filling.

In the exemplary embodiment, the contents of zero-indexed array 92 are arranged so as to allow extraction of short lists by sequential extraction between and inclusive of bounds, but other arrangements may also be employed with complementary methods of extraction. Further, employment of the various means of encoding according to the system and method of the present invention will be readily appreciated by those skilled in the art. As will also be readily appreciated, encoding an address database according to zip code may be accomplished by means of the system and method of the present invention.

Figure 4:
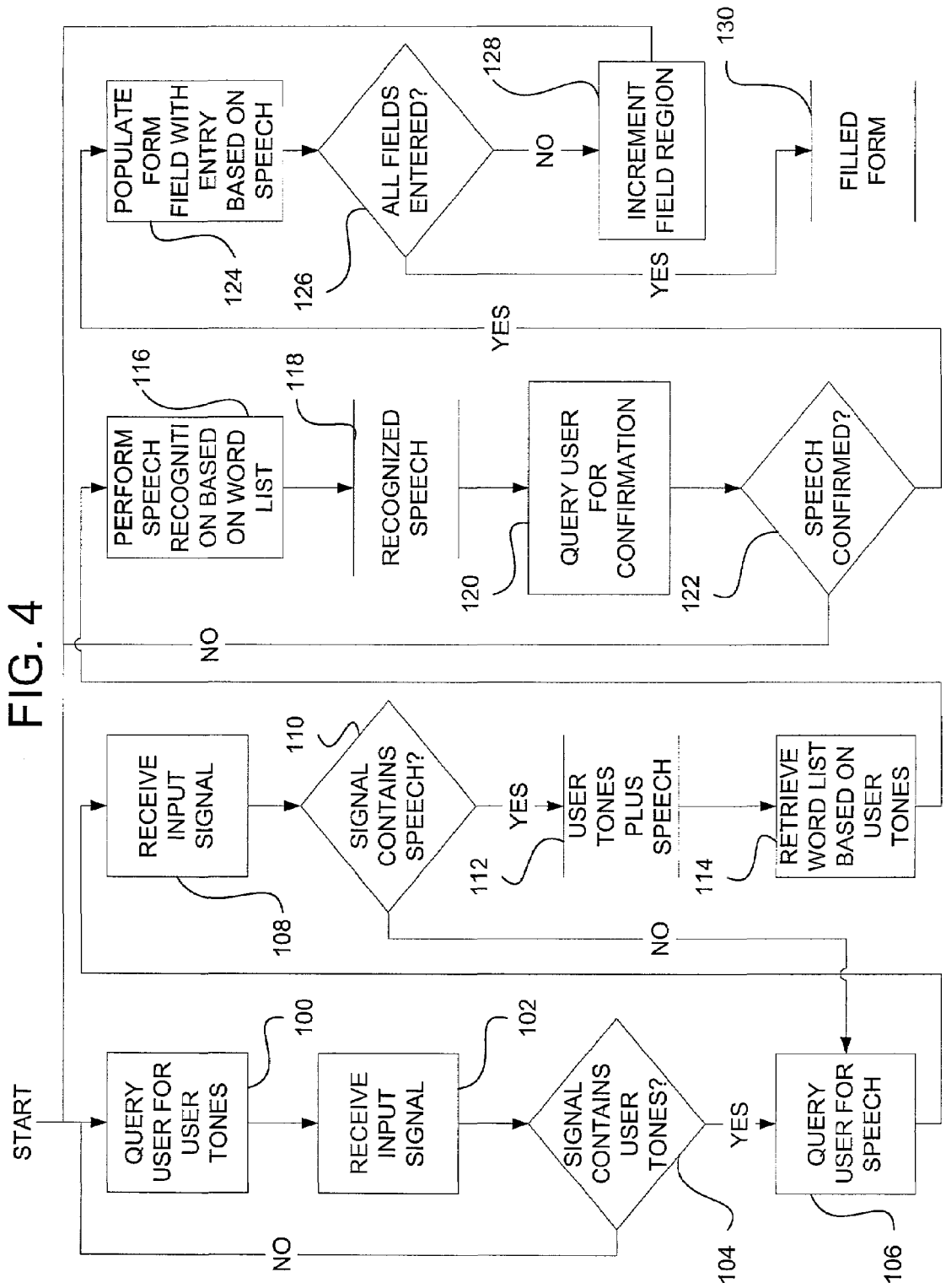
FIG. 4 is a flow chart diagram depicting a method of operation for form-filling according to the system and method of the present invention.

Referring to FIG. 4, a flow chart diagram depicting a method of operation for form-filling according to the system and method of the present invention is shown. Starting at step 100, a user is queried to enter user tones via a keypad of the type used with a touch-tone telephone system. Upon receipt of the following input signal at step 102, and depending on whether the input signal contains user tones as at 104, the method proceeds to query the user for speech at step 106. Upon receipt of the following input signal at step 108, and depending on whether the input signal contains speech as at 110, an input signal containing user tones plus speech has been received as at 112. Following receipt of user tones plus speech, a word list is retrieved based on user tones at step 114. If the user tones constrain the contents of the subject database to the point that no word list can be retrieved, it may be desirable to start over. However, such occurrences may usually be eliminated where a query for confirmation by a user regarding the input signal is used to eliminate mistakes. Such queries can further prove useful where an empty list results from a user attempting to enter a name which is not in the main database. Attempted entry of a foreign name, for example, could result in such an occurrence. In this case, the user could be asked to say and also spell the name as detailed above, and the result could eventually be confirmed by spelling back the recognized name using, for example, text to speech. Thus, the user could be asked to confirm the spelling of the recognized name.

Upon retrieval of a word list based on user tones, speech recognition is performed based on the word list at step 116. The resulting recognized speech 118 may be spoken and/or spelled out to the user and a query for confirmation issued at step 120. Depending on whether the speech is confirmed as at 122, the form field is populated with the entry based on the recognized speech at step 124. Depending on whether all fields have been entered as at 126, the field region may be incremented at step 128 and processing continue at step 100. However, if all fields have been entered as at 126 a filled form 130 results.

Various and additional utilization of constraint via user manipulation of a manual input device may be employed that is consistent with the system and method of the present invention. For example, a user may be requested to input initials of a name rather than spell out the name in part or full measure. Further, a single button may be pressed seven times by a user to indicate that a word contains seven letters. Thus, a candidate portion of a database containing only data of seven letter words may be used for speech recognition. Alternatively, even two presses of a button may indicate that a word consists of at least two letters. Still further, pressing a button may indicate that the first letter of the word precedes the letter "N" in alphabetical order. The instructions for utilizing the constraint method chosen, thus, need only be communicated to the user, and various and additional means of constraint with the manual input device will be readily apparent to one skilled in the art.

Similarly, a user may be queried for input speech preceding the query for user tones. Accordingly, a user may then enter user tones until enough constraint has occurred to permit recognition of the input speech as disclosed above. Further, it may be desirable to re-expand a candidate portion following constraint based on a probability of user error such as misspelling of an entry.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A constraint-based speech recognition system for use with a form-filling application employed over a telephone system, the system comprising:
   an input signal comprising:
   a) speech input, and
   b) non-speech input of a type generated by a user via a manually operated device;
   a constraint module operable to:
   a) access an information database containing information suitable for use with speech recognition, wherein the information database is a hierarchical data structure of short lists of speech recognition candidates, the short-lists being hierarchically arranged according to predefined classes that can be entered via the non-speech input, and
   b) generate candidate information based on the non-speech input and the information database, the candidate information corresponding to a portion of the information, wherein said constraint module requires entry by a user of only so many classes via the non-speech input as required to provide sufficient constraint for speech recognition in accordance with at least one of: (a) a maximum amount of the candidate information; or (b) a maximum measure of confusability between candidates of the candidate information; and a speech recognition module operable to recognize speech based on the speech input and the candidate information.

2. The system of claim 1, wherein the manually operated device defines a plurality of classes, and wherein the information database is encoded according to the plurality of classes.

3. The system of claim 1, wherein the information is further defined to be suitable for populating a form data structure accessible to the form-filling application.

4. The system of claim 1, wherein the manually operated device is further defined as a keypad of the type used with a touch-tone telephone, and wherein the non-speech input is further defined as user-generated tones.

5. The system of claim 4, wherein the keypad defines a plurality of classes, and wherein said information database is encoded according to the plurality of classes.

6. The system of claim 5, wherein at least one class associated with the plurality of classes is further defined to be a number-letter combination corresponding to a combination of letters and a number visually represented on the keypad as associated with a key of the keypad.

7. The system of claim 6, wherein the information is further defined to be at least one of:
   a) names, and
   b) addresses, and
   wherein the information database is further defined to be at least one of:
   a) encoded according to combinations of letters based on the key classes, the combinations potentially representative of names, and
   b) encoded according to zip codes associated with the addresses.

8. The system of claim 1, wherein the amount of the candidate information is dictated by the measure of confusability on a lexicon storing pronunciation of each of a plurality of the speech recognition candidates in conjunction with its spelling.

9. The system of claim 8, wherein said constraint module deems a shortlist of the speech recognition candidates as sufficiently constrained if each member of the short list differs in pronunciation from each other member of the shortlist by at least one phoneme.

10. The system of claim 8, wherein said constraint module deems a shortlist of the speech recognition candidates as sufficiently constrained if a number of speech recognition candidates in the short list is below a predetermined threshold.

11. A constraint-based speech recognition method for use with a form-filling application at a telephone, the method comprising:
   receiving an input signal, the signal comprising speech input and non-speech input, the non-speech input of a type generated by a user via a manually operated device;
   accessing an information database containing information suitable for use with speech recognition, wherein the information database is a hierarchical data structure of short lists of speech recognition candidates, the shortlists being hierarchically arranged according to pre-defined classes that can be entered via the non-speech input;
   generating candidate information based on the non-speech input, the candidate information corresponding to a portion of the information, including requiring entry by a user of only so many classes contained in said non-speech input as required to provide sufficient constraint for speech recognition in accordance with at least one of: (a) a maximum amount of the candidate information; or (b) a maximum measure of confusability between candidates of the candidate information; and
   recognizing speech based on the speech input and the candidate information.

12. The method of claim 8, wherein the manually operated device defines a plurality of classes, and wherein the information database is encoded according to the plurality of classes.

13. The system of claim 11, wherein the information is further defined to be suitable for populating a form data structure accessible to the form-filling application.

14. The method of claim 11, wherein the manually operated device is further defined as a keypad of a type used with a touch-tone telephone, and wherein the non-speech input is further defined as user-generated tones.

15. The method of claim 14, wherein the keypad defines a plurality of classes, and wherein said information database is encoded according to the plurality of classes.

16. The method of claim 15, wherein at least one class associated with the plurality of classes is further defined to be a number-letter combination corresponding to a combination of letters and a number visually represented on the keypad as associated with a key of the keypad.

17. The method of claim 16, wherein the information is further defined to be at least one of:
   a) names, and
   b) addresses, and
   wherein the information database is further defined to be at least one of:
   a) encoded according to combinations of letters based on the key classes, the combinations potentially representative of names, and
   b) encoded according to zip codes associated with the addresses.

18. A method of constraint for use with a speech recognition system, the method comprising:
   receiving an input signal, the signal comprising non-speech input of the type generated by a user via a keypad of the type used with a touch-tone telephone;
   accessing an information database containing searchable information wherein the information database is a hierarchical data structure of short lists of speech recognition candidates, the shortlists being hierarchically arranged according to pre-defined classes that can be entered via the non-speech input; and
   generating candidate information based on the non-speech input, the candidate information corresponding to a portion of the searchable information, including requiring entry by a user of only so many classes contained in said non-speech input as required to provide sufficient constraint for speech recognition in accordance with at least one of: (a) a maximum amount of the candidate information: or (b) a maximum measure of confusability between candidates of the candidate information.

* * * * *